L. C. EDWARDS.
POULTRY FEEDING DEVICE.
APPLICATION FILED JAN. 18, 1910.

1,052,804.

Patented Feb. 11, 1913.

WITNESSES:

INVENTOR

UNITED STATES PATENT OFFICE.

LOUIS C. EDWARDS, OF ELLINGTON, CONNECTICUT.

POULTRY-FEEDING DEVICE.

1,052,804.  Specification of Letters Patent.  Patented Feb. 11, 1913.

Application filed January 18, 1910. Serial No. 538,697.

*To all whom it may concern:*

Be it known that I, LOUIS C. EDWARDS, a citizen of the United States, and a resident of Ellington, in the county of Tolland and State of Connecticut, have invented certain new and useful Improvements in Poultry-Feeding Devices, of which the following is a specification.

The object of the invention is to produce a poultry-feeding device which has features of novelty and advantage.

Figure 1:
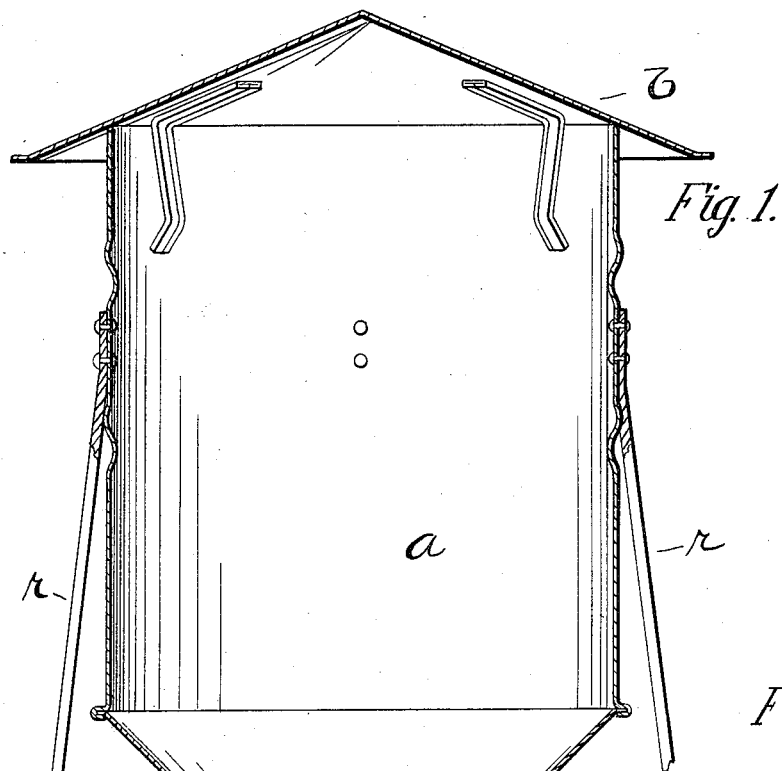
Figure 2:
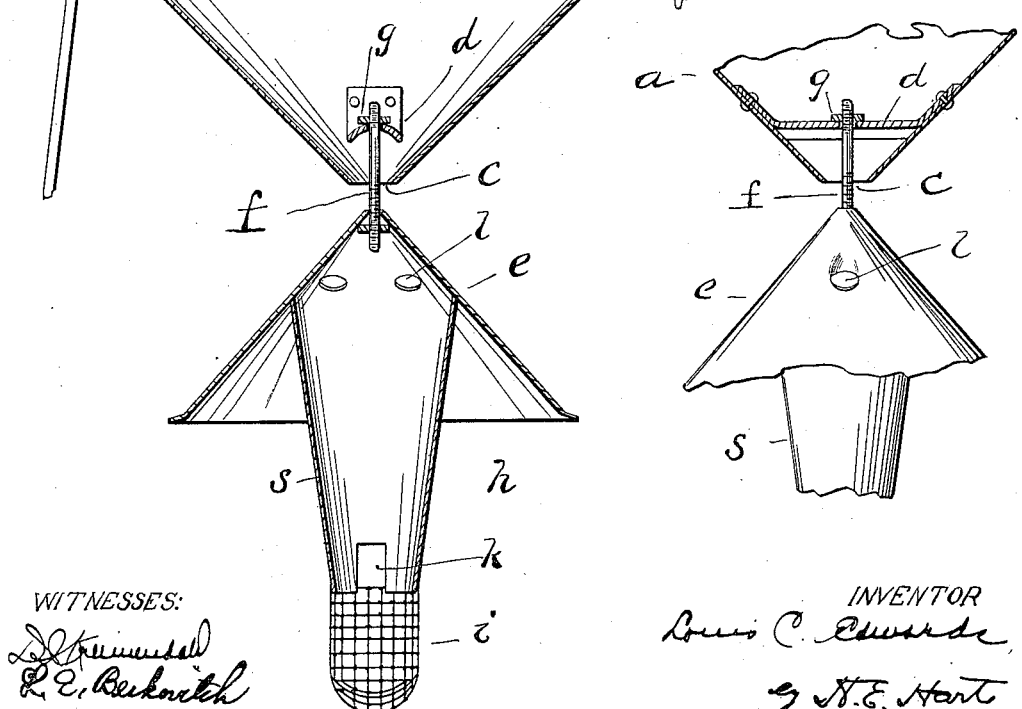

In the drawings—Figure 1 is a central vertical section of an embodiment of my invention. Fig. 2 is a view of part of the device looking from the right of Fig. 1, shown partly in central section.

Referring to the drawings $a$ is the container or hopper, which may be filled with the material used as a food. It is provided with a cover $b$. The lower end of the container has converging sides terminating in an orifice $c$. Secured within the hopper above the discharge orifice is a bridge-piece $d$. A deflector $e$ is supported on a stem $f$ which passes up through the discharge outlet $c$ through an aperture in the bridge $d$ and is held by a nut $g$ in such manner that the deflector is free to swing from side to side in any direction. Depending from the under side of the deflector is a bait-holder $h$ in the form of a tubular sleeve $s$ having at its lower end a wire mesh basket $i$, the lower end of the tubular sleeve being cut away to form outlets $k$. A number of openings $l$ are formed through the deflector giving access to the interior of the tubular sleeve leading to the basket $i$.

Assuming for the purpose of illustration that the hopper is filled with corn and the deflector and bait-holder are stationary, under these circumstances the supporting stem $f$ passes through the discharge outlet at about its center and chokes it so that the corn will not be discharged from the outlet. As a hen discovers the corn in the bait basket $i$ and pecks at it the deflector is started swinging and as the supporting stem $f$ moves from side to side in the discharge outlet $c$ the corn will fall through the outlet, strike the deflector, and be thrown onto the ground. As soon as the deflector comes to rest the outlet is again choked, but it is so balanced that merely a light blow on the basket is required to set it swinging. Occasionally kernels of corn will drop through the openings $l$ down the tubular sleeve $s$ into the bait basket and as this basket becomes filled the corn will drop out through the openings $k$ onto the ground. The discharge outlet $c$ is preferably circular and that part of the deflector immediately under it is preferably conical; by rotating the deflector, the nut $g$ remaining stationary, it can be drawn up until its point enters the discharge outlet $c$ and in this way the size of the discharge outlet can be varied so that anything between the finest and coarsest varieties of food can be used in this device. In practice I have found that the weight of the deflector on the nut $g$ is sufficient to prevent it from turning when the deflector is rotated, but if desired other means can be provided for holding the nut $g$ against rotation. The feeder is intended to be supported at a suitable distance from the ground by the legs $r$.

This device provides an inexpensive and entirely practical automatic feeder for poultry and one that is so lightly balanced that it can be worked by the young birds as well as old and the swinging movement of the deflector throws the grain in a larger radius than if it were stationary.

I claim:—

1. An article of the character described comprising a hopper having a discharge outlet at its bottom, a stem swingingly supported within said hopper and extending through said outlet, a deflector secured to said stem below said outlet, a tubular sleeve depending from the under side of said deflector, a bait basket secured to the lower end of said sleeve, said deflector having passages through it into the interior of said tubular sleeve.

2. An article of the character described comprising a hopper having a discharge outlet at its bottom, a stem swingingly supported within said hopper and extending through said outlet, a deflector secured to said stem below said outlet, a tubular sleeve depending from the under side of said deflector, a bait basket secured to the lower end of said sleeve, said deflector having passages through it into the interior of said tubular sleeve, said sleeve having an aperture through its wall above said bait basket.

LOUIS C. EDWARDS.

Witnesses:
H. E. HART,
LENA E. BERKOVITCH.